United States Patent
Stabel et al.

(10) Patent No.: US 11,599,765 B2
(45) Date of Patent: Mar. 7, 2023

(54) IDENTIFICATION ELEMENT FOR A SHANK TOOL

(71) Applicant: Balluff GmbH, Neuhausen a.d.F. (DE)

(72) Inventors: Eberhard Stabel, Stuttgart (DE); Robert Beutler, Denkendorf (DE)

(73) Assignee: BALLUFF GMBH, Neuhausen ADF (DE)

( * ) Notice: Subject to any disclaimer, the term of this patent is extended or adjusted under 35 U.S.C. 154(b) by 203 days.

(21) Appl. No.: 17/074,835

(22) Filed: Oct. 20, 2020

(65) Prior Publication Data

US 2021/0125023 A1 Apr. 29, 2021

(30) Foreign Application Priority Data

Oct. 25, 2019 (EP) ..................................... 19205313

(51) Int. Cl.
| | | |
|---|---|---|
| *G06K 19/077* | (2006.01) | |
| *B23B 51/00* | (2006.01) | |
| *G06K 19/04* | (2006.01) | |

(52) U.S. Cl.
CPC ........ *G06K 19/07758* (2013.01); *B23B 51/00* (2013.01); *G06K 19/04* (2013.01); *G06K 19/07773* (2013.01); *B23B 2270/36* (2013.01)

(58) Field of Classification Search
CPC .................. G06K 19/04; G06K 19/045; G06K 19/07758; B23B 2270/36; G08B 13/2434
USPC ................. 235/492; 340/572.1, 572.8, 572.9
See application file for complete search history.

(56) References Cited

U.S. PATENT DOCUMENTS

| | | | |
|---|---|---|---|
| 2003/0012584 A1* | 1/2003 | Yamanoi | G03G 15/0216 |
| | | | 399/176 |
| 2005/0189408 A1 | 9/2005 | Corbett | |
| 2011/0226856 A1* | 9/2011 | Meilland | G06K 19/07749 |
| | | | 235/488 |
| 2012/0217307 A1* | 8/2012 | Martin | G06K 19/027 |
| | | | 29/601 |
| 2014/0048605 A1* | 2/2014 | Gatling | B25B 15/001 |
| | | | 235/492 |

FOREIGN PATENT DOCUMENTS

| | | | |
|---|---|---|---|
| WO | 2014028462 A1 | 2/2014 | |
| WO | 2016116080 A1 | 7/2016 | |
| WO | WO-2021078746 A1 * | 4/2021 | ............. B23B 51/00 |

OTHER PUBLICATIONS

English-equivalent machine translation of WO 2021/078746, retrieved from European Patent Office online, retrieved on Jun. 22, 2022 (Year: 2022).*
Application No. EP 19208408, retrieved from WIPO,, 43 pgs. retrieved Sep. 21, 2022 (Year: 2022).*
Machine translation by Google of EP19208408, EP 19208408, 43 pgs., retrieved Sep. 21, 2022 (Year: 3033).*

* cited by examiner

*Primary Examiner* — Suezu Ellis
(74) *Attorney, Agent, or Firm* — GableGotwals

(57) ABSTRACT

An identification element (50) for a shank tool has an elastic inner ring (10) and an outer ring (20) arranged around the inner ring (10), said outer ring having a recess formed annularly in the outer ring. An RFID transponder is arranged in the recess. The inner ring (10) of the identification element (50) encloses a shank of the shank tool.

14 Claims, 9 Drawing Sheets

IDENTIFICATION ELEMENT FOR A SHANK TOOL

CROSS-REFERENCE TO RELATED APPLICATIONS

This application claims priority to European Patent Application No. 19205313.0 filed 25 Oct. 2019 which is incorporated herein by reference.

The present invention relates to an identification element for a shank tool. Furthermore, it relates to a shank tool which has the identification element.

PRIOR ART

Attachable and removable identification elements for cutting shank tools, in particular drills or end mills, which have an identifier for identifying shank tools, are known. Such identification elements can be attached to the shank of the shank tool and removed again from the shank of the shank tool. If such an identification element is attached to a shank tool, it enables the identification of the corresponding shank tool. An example of such an identification element, which can be attached to shank tools such as drills, for example, is described in WO 2014/028462 A1. The identification element described there comprises an RFID transponder (radio-frequency identification) having a digital, identifying code as an identifier. Furthermore, this identification element comprises a metal core and a plastic cover, which encloses the core and the RFID transponder. The core has several grooves on its outer surface which interact with projections on the cover in order to hold it on the core. Furthermore, the cover can also be held on the core with adhesive. This identification element can be attached to the shank of the drill and fixed in the axial direction of the drill by screwing it tight with a grub screw which is screwed into the core.

Such identification elements have the disadvantage that their attachment to the shank of the shank tool is complex and they permanently disturb and impair the function of the shank tool to which they are attached. In this way, the shank of the shank tool is weakened by the attachment by means of the grub screw, whereby the probability of a tool breakage is increased. Furthermore, due to their high weight, such identification elements generate a strong imbalance of the shank tool even with small errors in their balancing, which leads to an eccentric rotational movement of the shank tool. Due to this eccentric rotational movement, on the one hand, clean surfaces on the workpiece to be worked on cannot be produced. On the other hand, the eccentric rotational movement damages the shank tool very quickly by wearing out the cutting edges of the shank tool much more quickly and by increasing the probability of a tool breakage.

An object of the present invention is to provide an identification element for a shank tool which can be easily attached to the shank of the shank tool and does not significantly disturb or impair the function of the shank tool. A further object of the invention is to provide a shank tool which has the identification element.

SUMMARY OF THE INVENTION

One of these objects is solved in one aspect of the invention by an identification element for a shank tool which has an elastic inner ring and an outer ring. The outer ring is arranged around the inner ring. An annular recess is formed in the outer ring, in which an RFID transponder is arranged. The identification element is thus realised in two parts.

The inner ring serves to contact the identification element with the shank tool. It is designed to be elastic in order to enable the identification element to be pushed over a shank of the shank tool on the one hand and to hold it in position during operation of the shank tool on the other. The elasticity can be achieved in different ways. In principle, it is possible that the inner ring is made of a material that is itself not elastic. By way of example, it can consist of several non-elastic parts which are elastically connected to one another. It is also possible that the inner ring is a stamped or additively manufactured spring element made of a metal. Preferably, however, the elasticity is based on the material used. For this purpose, the identification element preferably consists of a material with a modulus of elasticity of maximum 1 GPa. More preferably, the modulus of elasticity is a maximum of 500 MPa and most preferably a maximum of 100 Mpa. The modulus of elasticity can be determined in a tensile test according to the standard DIN EN ISO 527-1. The material of the inner ring is preferably an elastomer. Since cutting shank tools in industrial production typically heat up to an operating temperature of 90° C., it is preferable that the glass transition temperature of the material, of which the inner ring consists, is less than 90° C. Particularly preferably, it is less than 20° C., in order to prevent the inner ring from becoming brittle at room temperature.

The Shore hardness of the inner ring is preferably at least 65 A. It can be determined according to the standard DIN ISO 7619-1:2012-02.

An inner diameter of the inner ring is preferably at least 6 mm. In this way, it is large enough to enclose the shank of the shank tools typically used in industry. Inner rings with a smaller inner diameter and matching outer rings with a correspondingly smaller diameter would be so fragile that they might not be able to withstand the mechanical loads in the industrial use of shank tools.

The outer shell of the inner ring has a first end and a second end along its longitudinal axis. At the first end of the outer shell, there is preferably a stop which projects from the outer shell. Preferably, it projects by at least 1.0 mm. The stop prevents the outer ring from moving beyond the first end of the inner ring and thereby secures the outer ring to the inner ring.

In principle, it is possible that the stop does not revolve completely around the outer surface of the inner ring, but instead consists only of one or more separate projections. However, it is preferable that the stop is designed to be annular and thus revolves completely around the outer shell of the inner ring. In this embodiment of the identification element, the stop serves not only to limit movement of the outer ring relative to the inner ring, but also additionally creates a seal which prevents a coolant or lubricant from the shank tool from getting between the inner ring and the outer ring.

At the second end of the interior ring, an annular retaining region is preferably arranged on the outer shell. Like the stop, the retaining region also projects from the outer shell. However, the retaining region does not project as far as the stop. Preferably, it projects by a maximum of 0.5 mm.

While the stop limits a movement of the outer ring along the inner ring towards the first end, the retaining region limits a movement of the outer ring along the inner ring towards the second end. The inner ring and the outer ring are therefore preferably arranged in the identification element in such a way that an inner shell of the outer ring is arranged between the stop and the retaining region. However, while the stop projects to such an extent that it prevents a movement of the outer ring beyond the first end, a movement of the outer ring beyond the second end is only made more difficult by the retaining region which does not project as far. Since the retaining region is just as elastic as the rest of the inner ring, it can be compressed under the application of force. When assembling the identification element, this enables the outer ring to be pushed over the inner ring while compressing the retaining region until the retaining region finally returns to its original shape and the outer ring engages between the stop and the retaining region.

By way of example then, if the shank tool is to be reground, it may be necessary to temporarily remove the identification element from the shank of the shank tool. If the inner ring is pushed over the cutting edge of the shank tool during this process, it can result in damage to the inner ring. This can also occur when the identification element is applied to the shank for the first time or when it is reapplied. In addition, the inner ring is exposed to coolants and lubricants during operation of the shank tool, which can cause long-term damage to the material of the inner ring. As a result, it is possible that the inner ring will be so severely damaged over the life of the shank tool that it will no longer hold the identification element securely on the shank tool. In this case, however, it is not necessary to replace the entire identification element. Instead, the inner ring can be separated from the outer ring by recompressing the retaining region and pushing the outer ring off the inner ring across the second end of the inner ring. A new inner ring can then be pushed into the outer ring. It is advantageous to replace only the inner ring, since the outer ring contains the RFID transponder. On the one hand, this prevents the unnecessary replacement of an expensive electronic component and, on the other hand, it ensures that a shank tool is assigned the same RFID transponder over its whole lifetime, such that it can be identified reliably.

The inner shell of the outer ring preferably has several projections. While the stop and the retaining region prevent the outer ring from moving along the longitudinal axis of the identification element, a rotation of the outer ring around the inner ring can be made difficult or be prevented by the projections. For this purpose, a wave structure, a ribbed structure or a tooth structure of the projections is in particular preferred. This can be designed in such a way that the waves, ribs or teeth run along the longitudinal axis of the outer ring. This does not make it more difficult to attach the outer ring to the inner ring or to remove the outer ring from the inner ring. For this purpose, the outer ring and the inner ring are displaced relative to each other along their common longitudinal axis, such that this movement takes place along the waves, ribs or teeth. A rotation of the inner ring relative to the outer ring would, however, occur transversely to the waves, ribs or teeth. Due to the elasticity of the inner ring, the movement of the waves, ribs or teeth over the outer shell of the inner ring would constantly compress and decompress the inner ring at certain points, which would cause very high friction between the outer ring and the inner ring. The outer ring preferably consists of a thermoplastic material. This has the advantage that it enables the outer ring to be manufactured in an injection moulding process. As a result, it can be easily manufactured with the recess and, if necessary, with the projections. Given a typical working temperature of shank tools in industrial use of 90° C., the softening temperature of the thermoplastic material is preferably at least 100° C.

Particularly preferred thermoplastic materials for manufacturing the outer ring are polyphenylene sulphide (PPS) and liquid crystalline polymers (LCP), wherein the liquid crystalline polymers are most particularly preferred. These polymers enable the production of a stable outer ring even with a very low wall thickness. In particular, the wall thickness is less than 0.5 mm and thus enables a very easy implementation of the outer ring.

Even if, for example, the LCP is a self-reinforcing plastic, it can be provided, in order to further strengthen the outer ring against mechanical loads, that its material is a glass fibre reinforced plastic. The weight proportion of glass fibres in the glass fibre reinforced plastic is preferably more than 5 wt. %, particularly preferably more than 10 wt. %.

The RFID transponder preferably has an annular antenna which is arranged in the recess. The annular peripheral arrangement of the antenna prevents it from causing an imbalance in the identification element. Even though the RFID transponder itself increases the weight of the outer ring in its position at certain points, this weight is so low that the identification element can be manufactured in the best balancing class.

In order to fix the RFID transponder and the antenna securely in the recess and to protect them against mechanical damage, it is preferable that a filling compound is arranged in the recess to enclose the RFID transponder and the antenna. The filling compound can in particular be a polyurethane casting compound. The filling compound is preferably arranged in the recess in such a way that it fills it completely.

Another aspect of the invention relates to a shank tool which has the identification element. The inner ring of the identification element encloses a shank of the shank tool. In order to ensure that the correct identification element is reattached to the shank tool in case the identification element is removed from the shank tool, for example for the purpose of regrinding, it is preferred that both the identification element and the shank tool each have a visual marking. Visual markings on shank tools are already known today to identify these individually. For this purpose, for example, a 3D code or data matrix code is lasered into the shank tool. However, this is easily removed by mechanical action during operation of the shank tool, such that a reliable identification is no longer possible if, for example, a regrinding of the shank tool becomes necessary. In order to prevent such a removal of the visual feature on the shank tool, it is therefore preferable that the identification element is arranged on the shank tool in such a way that the inner ring covers the visual feature. As long as the identification element is mounted on the shank tool, reading the visual feature on the shank tool is not possible, but is also not necessary. In this case, the identification of the shank tool can occur by means of the RFID transponder. An identifying code which can be read digitally from the identification element by means of the RFID transponder also has the advantage that an automation of the operation of a programmable machine tool, in which the shank tool is used, is facilitated. If the shank tool and the identification element are separated from each other, the visual feature on the shank tool is readable again, such that it can be clearly assigned to its identification element at a later time.

The identification element is preferably attached to the shank tool in such a way that the stop of the inner ring is arranged on a side of the identification element facing a tool head. This allows the stop to perform a sealing function and thereby prevent coolant and lubricant from getting between the inner ring and the outer ring during operation of the shank tool. A complete sealing is preferably achieved when the stop is designed to be annular.

Furthermore, it is preferred that the stop of the inner ring covers a visual marking of the identification element, which is attached to the outer ring. In this way, the visual marking can be protected against flying chips. If the inner ring and the outer ring are separated from each other, then the visual marking becomes visible again.

BRIEF DESCRIPTION OF THE DRAWINGS

Exemplary embodiments of the invention are depicted in the drawings and are explained in more detail in the following description.

FIG. 1b shows another isometric depiction of the inner ring according to FIG. 1a.

FIG. 2b shows another isometric depiction of the inner ring according to FIG. 2a.

FIG. 4b shows a sectional view according to the line IVb-IVb in FIG. 4a.

FIG. 5b shows a sectional view of the outer ring according to FIG. 5a.

FIG. 8b shows another isometric depiction of the shank tool according to FIG. 8a.

DESCRIPTION OF THE INVENTION

Figure 1A:
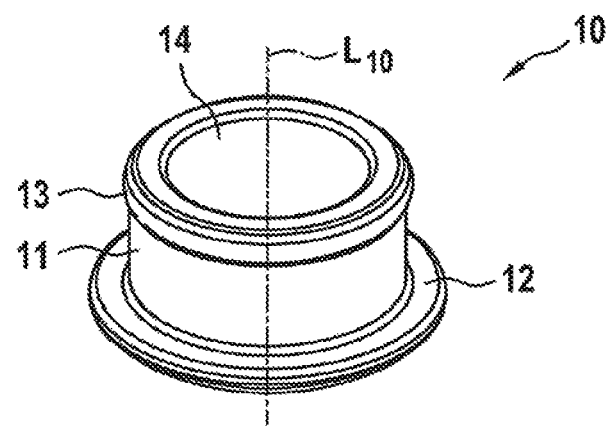
FIG. 1a shows an isometric depiction of an inner ring of an identification element according to an exemplary embodiment of the invention.
Figure 1B:
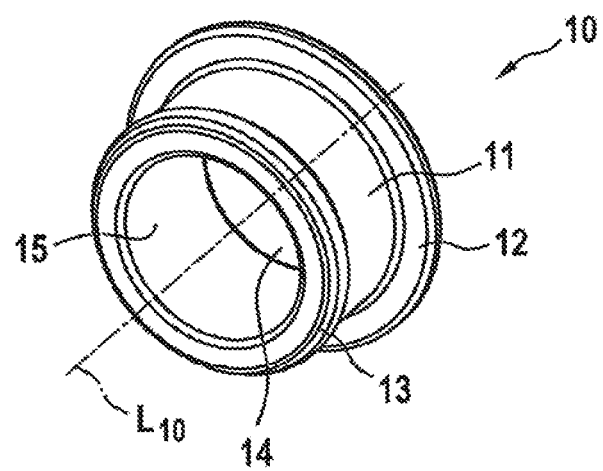

An inner ring 10, which is used in a first exemplary embodiment of the identification element according to the invention, is depicted in FIGS. 1a and 1b. In the present exemplary embodiment, it consists of the elastomer Elastollan® C 70 A HPM (BASF), which has a Shore hardness of 70 A. It has an outer shell 11 from which a stop 12 protrudes at one end and a retaining region 13 at its other end. The stop 12 and the retaining region 13 are opposite each other along a longitudinal axis $L_{10}$ of the inner ring 10. An opening 14 of the inner ring is surrounded by its inner shell 15. Its inner diameter is 6 mm and its wall thickness is 1.075 mm, such that it results in an outer diameter of 8.15 mm. The stop 12 protrudes by 1.2 mm from the outer shell 11 and the retaining region 13 protrudes by 0.2 mm from the outer shell 11. The inner ring 10 has a length of 5 mm along its longitudinal axis $L_{10}$, wherein the region of the outer shell 11, which lies between the stop 12 and the retaining region 13, has a length of 3 mm.

Figure 2A:
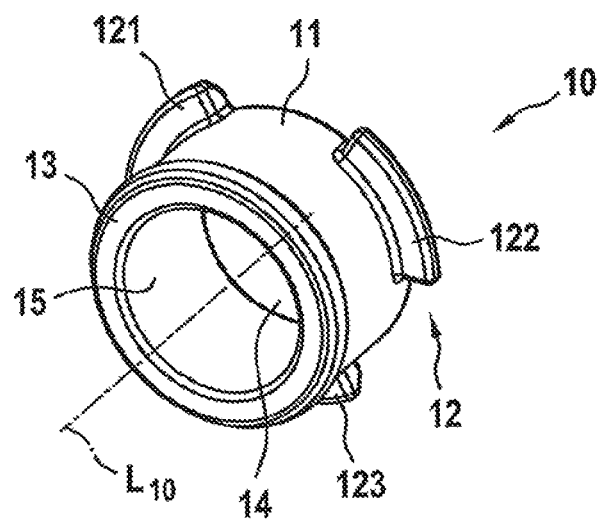
FIG. 2a shows an isometric depiction of the inner ring of an identification element according to another exemplary embodiment of the invention.
Figure 2B:
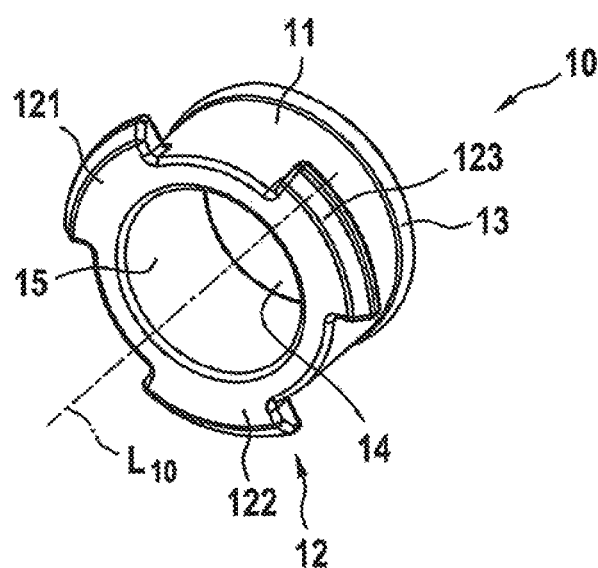

An inner ring 10, which is used in a second exemplary embodiment of the identification element, is depicted in FIGS. 2a and 2b. This differs from the inner ring 10 according to FIGS. 1a and 1b in that the stop 12 does not revolve annularly around the outer shell 11. Instead, it consists of three stop regions 121, 122, 123, which each cover a region of 60° of the circumference of the outer shell 11 and are symmetrically arranged around it.

Figure 3A:
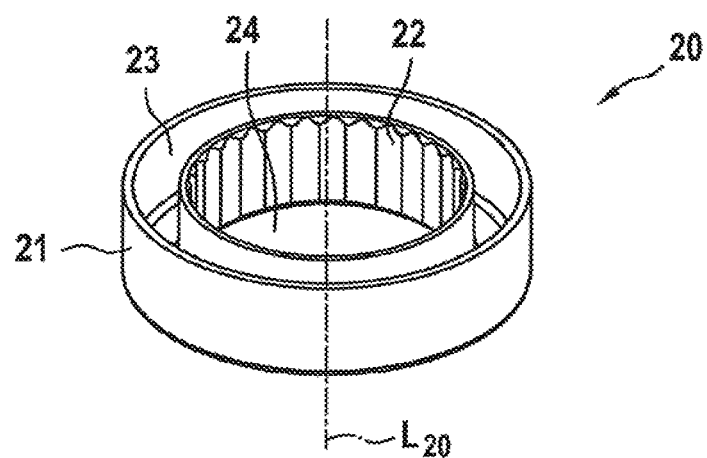
FIG. 3a shows an isometric depiction of an outer ring of an identification element according to an exemplary embodiment of the invention.
Figure 3B:
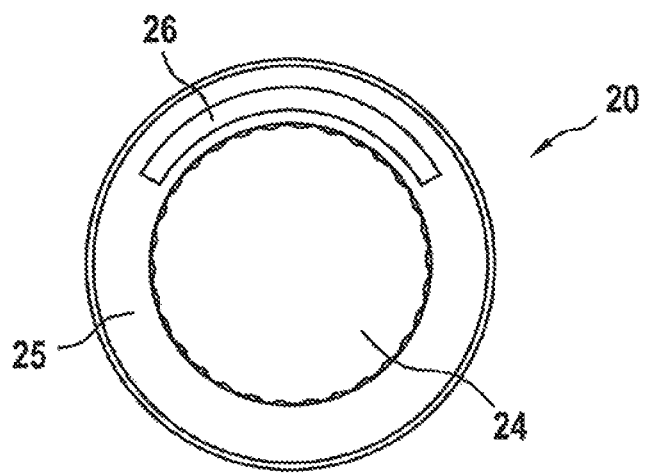
FIG. 3b shows a view of the outer ring according to FIG. 3a from its underside.

An outer ring 20, which in exemplary embodiments of the identification element can be combined either with the inner ring according to FIGS. 1a and 1b or with the inner ring according to FIGS. 2a and 2b, is depicted in FIGS. 3a and 3b. In the present exemplary embodiment, it consists of LCP with a glass fibre content of 15 wt. %. The outer diameter of its outer shell 21 is 12 mm. Its inner shell 22 has a sinusoidal wave structure with an amplitude selected in such a way that its inner diameter varies between 8.0 mm and 8.2 mm. A recess 23 runs annularly around the outer ring 20 in such a way that it is open at one end of the outer ring 20 along its longitudinal axis $L_{20}$ and closed at the other end. On its outside, it is limited by the outer shell 21, which has a wall thickness of 0.6 mm. On its underside, the recess 23 is limited by a base 25 of the outer ring 20. The base 25 has a visual marking 26 on its side facing away from the recess 23. This is attached near an opening 24 of the outer ring 20. The length of the outer ring 20 is 3 mm and thus corresponds to the length of the outer shell 11 of the inner rings between their respective stop 12 and their retaining region 13. Each of the inner rings 10 can therefore be inserted into the opening 24 of the outer ring 20 in such a way that the outer ring 20 engages between the stop 12 and the retaining region 13. Since the outer diameter of each inner ring 10 is larger than the minimum inner diameter of the outer ring 20 but smaller than the maximum inner diameter of the outer ring 20, the outer shell 11 of the inner ring 10 is only partially deformed by the wave structure of the inner shell 22 of the outer ring 20. This makes it easy to attach and remove the outer ring 20 on the inner ring 10 but makes it more difficult to rotate the outer ring 20 relative to the inner ring 10.

Figure 4A:
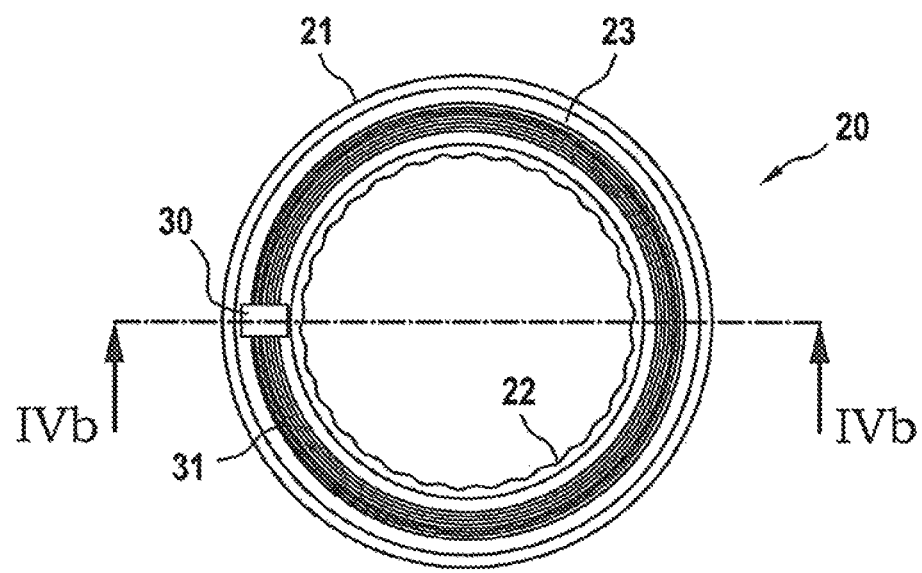
FIG. 4a shows in a top view how an RFID transponder and an antenna are arranged in the outer ring according to FIG. 3.
Figure 4B:
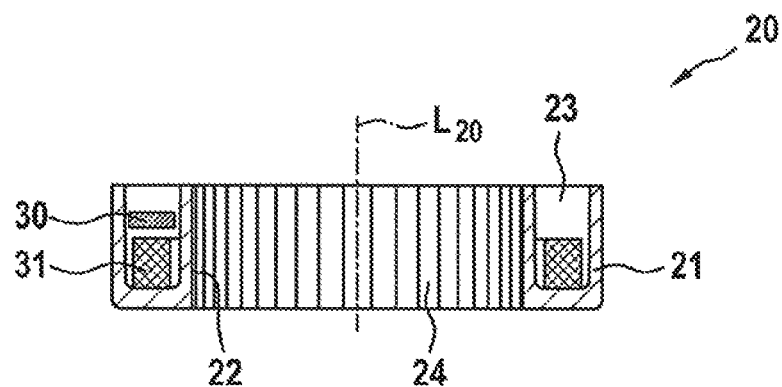

As depicted in FIGS. 4a and 4b, an RFID transponder 30 is arranged in the recess 23 together with an annular antenna 31 rotating in the recess 23. The RFID transponder 30 contains a unique identifier in the form of a code on a data storage unit, which makes it possible to identify a shank tool, to which the identification element is attached, by means of a read-out device.

Figure 5A:
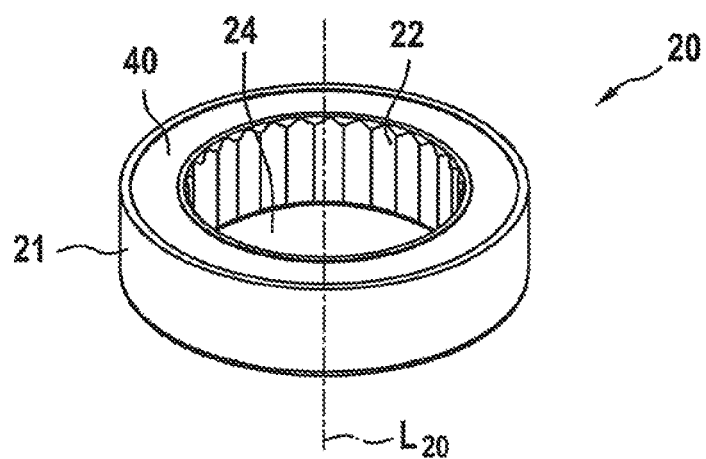
FIG. 5a shows an isometric depiction of the outer ring according to FIGS. 3, 4a and 4b, the recess of which has been filled with a filling material.
Figure 5B:
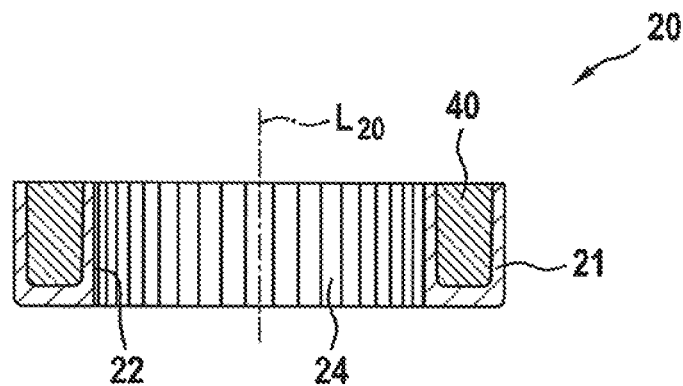

FIGS. 5a and 5b show that, after inserting the RFID transponder 30 and the antenna 31 into the recess 23, this recess is completely filled with a filling material 40, which is a polyurethane sealing compound in the present exemplary embodiment.

Figure 6:
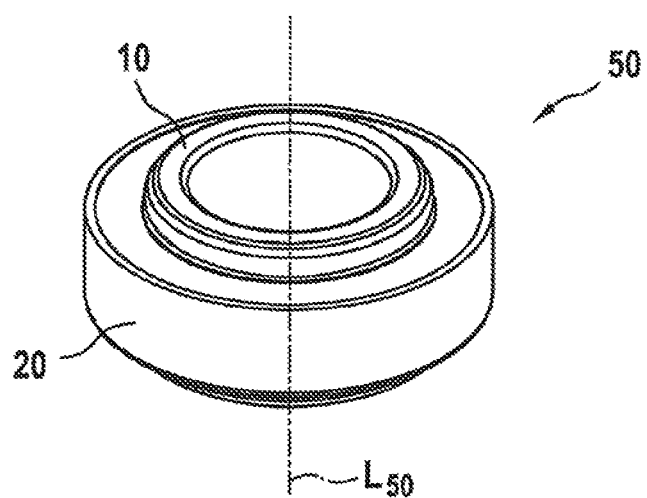
FIG. 6 shows an isometric depiction of an identification element according to an exemplary embodiment of the invention.

The outer ring 20 and one of the inner rings 10 are assembled by pushing the respective inner ring 10 with its retaining region 13 first through the opening 24 of the outer ring 20. This is done in such a way that the stop 12 is positioned on the side of the identification element 20 depicted in FIG. 6 below, thus forming one side of the identification element 50 together with the side of the outer ring 20 which consists of its fibreglass-filled LCP housing. If the inner ring according to FIGS. 1a and 1b is used, the annular stop 12 ensures that this side is particularly liquid-tight. On the other side of the identification element 12, the retaining region 13 adjacent to the filling material 40 comes to rest on the edge of the recess 23. The inner ring 10 and the outer ring 20 are now arranged such that their longitudinal axes $L_{10}$, $L_{20}$ are congruent with the longitudinal axis $L_{50}$ of the identification element 50.

Figure 7:
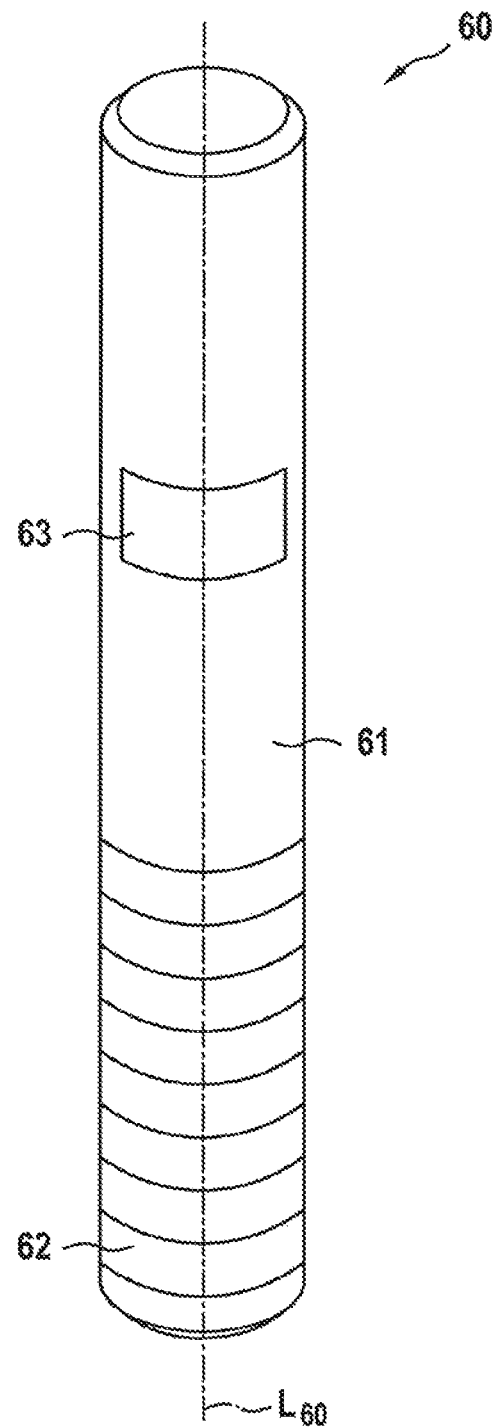
FIG. 7 shows an isometric depiction of a shank tool according to the prior art.

A conventional shank tool 60 is depicted in FIG. 7. This has a shank 61 which extends along the longitudinal axis $L_{60}$ of the shank tool 60 and ends in a tool head 62. Above the tool head 62, a visual marker 63 in the form of a 3D code is applied to the shank 61.

Figure 8A:
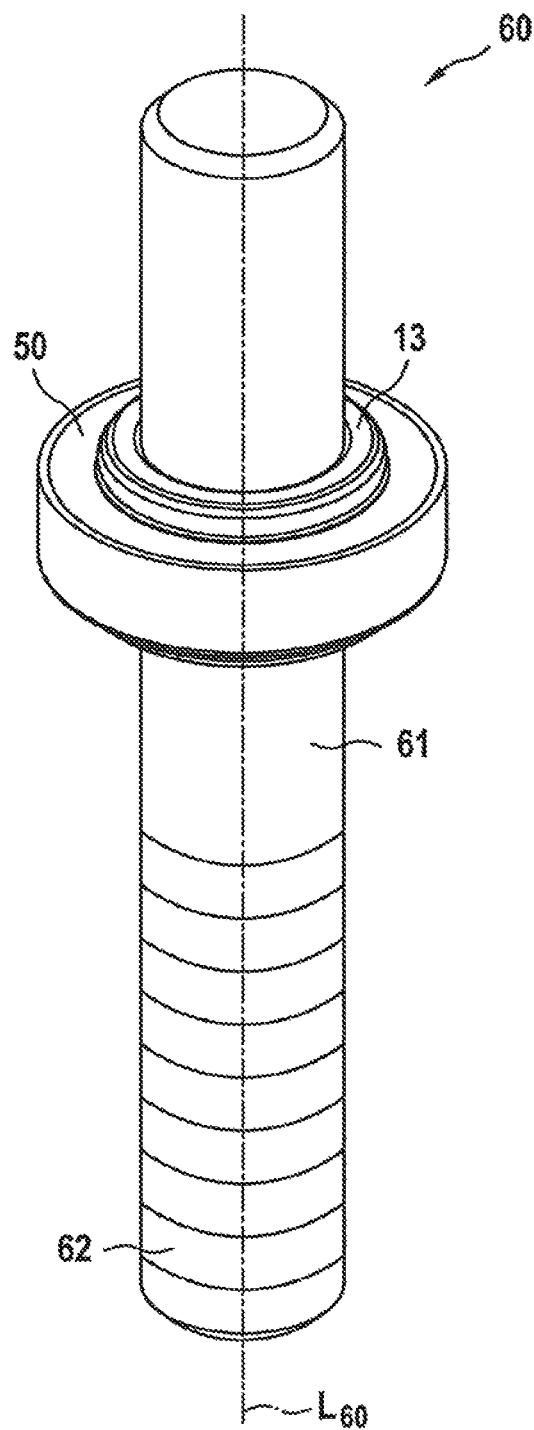
FIG. 8a shows an isometric depiction of a shank tool according to an exemplary embodiment of the invention.
Figure 8B:
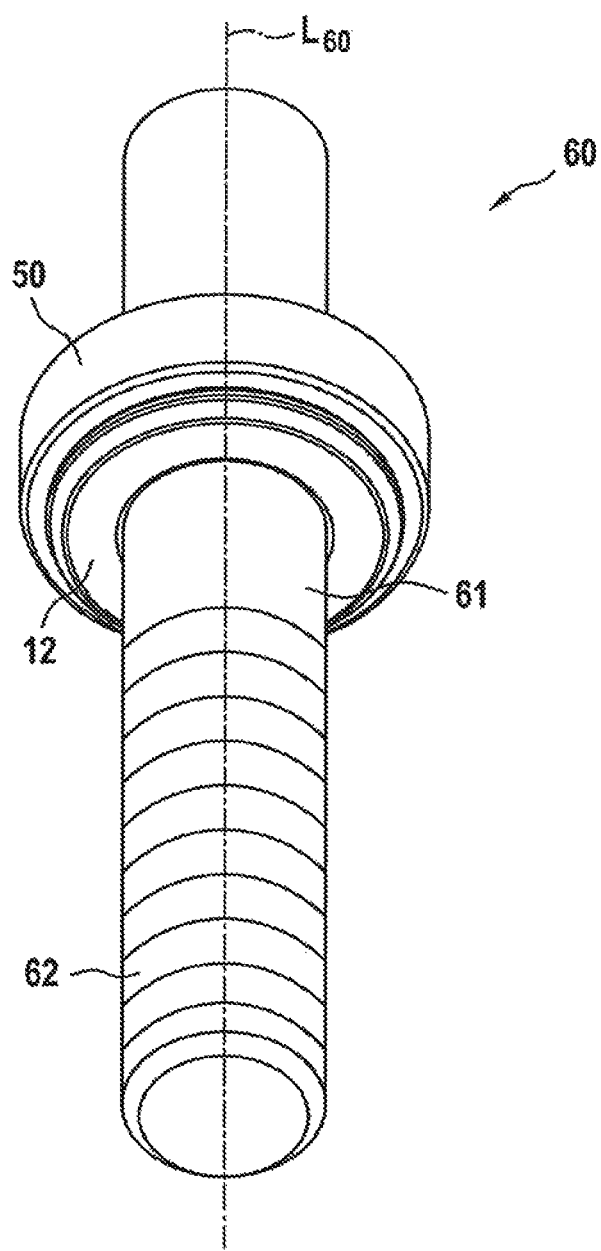

An exemplary embodiment of the shank tool 60 according to the invention is depicted in FIGS. 8a and 8b. This also has a shank 61, which extends along the longitudinal axis $L_{60}$ of the shank tool 60. In the present exemplary embodiment, the shank 61 has an outer diameter of 6 mm. The identification element 50 can therefore be pushed over the shank 61 in such a way that the inner ring 10 with its inner diameter of 6 mm encloses the shank 61 in a slip-proof manner. Due to the elasticity of the inner ring 10, it is still possible to attach and remove the identification element 50 under the effect of force by sliding the identification element 50 along the shank 61. To ensure a clear assignment between the shank tool 60 and its identification element 50, both have visual markers. The visual marker 63 of the shank tool 60 is the 3D code depicted in FIG. 7, which is covered by the identification element 50 in the depiction in FIGS. 8a and 8b. This protects the 3D code from mechanical abrasion. In FIGS. 8a and 8b, the tool head 62 of the shank tool 60 is located on its underside and thus faces the end of the identification element 50 that is formed by the base 25 of the outer ring 20 and the stop 12 of the inner ring 10. This prevents coolant and lubricant that splashes upwards from the tool head during operation of the shank tool 10 from getting between the inner ring 10 and the outer ring 20 or from collecting in any gaps in the filling material 40.

The invention claimed is:

1. An identification element for a shank tool, the identification element comprising: an elastic inner ring and an outer ring arranged around the inner ring, which has a recess formed annularly in the outer ring, wherein a radio frequency identification transponder is arranged in the recess, wherein the inner ring has a stop at a first end of an outer shell, said stop projecting from the outer shell.

2. The identification element according to claim 1, wherein the inner ring consists of a material having a modulus of elasticity of a maximum of 1 GPa.

3. The identification element according to claim 1, wherein the inner ring has an inner diameter of at least 6 mm.

4. The identification element according to claim 1, wherein the stop is annular.

5. The identification element according to claim 4, wherein the inner ring has an annular retaining region at a second end of the outer shell projecting from the outer shell, wherein the retaining region does not project as far as the stop.

6. The identification element according to claim 5, wherein an inner shell of the outer ring is arranged between the stop and the retaining region.

7. The identification element according to claim 1, wherein the outer ring consists of a thermoplastic material.

8. The identification element according to claim 1, wherein an inner shell of the outer ring has several projections.

9. The identification element according to claim 1, wherein the radio frequency identification transponder has an annular antenna which is arranged in the recess.

10. The identification element according to claim 9, wherein a filling compound is arranged in the recess, which encloses the radio frequency identification transponder and the annular antenna.

11. The shank tool according to claim 1, wherein the inner ring of an identification element encloses a shank of the shank tool.

12. The shank tool according to claim 11, wherein the inner ring covers a visual marking of the shank.

13. The shank tool according to claim 11, wherein the stop of the inner ring is arranged on a side of the identification element facing a tool head.

14. The shank tool according to claim 13, wherein the outer ring has a visual marking which is covered by the stop of the inner ring when the inner ring and the outer ring are assembled together.

\* \* \* \* \*